Sept. 15, 1964 P. SMITH 3,148,677
BRACHIAL TRANSDUCER
Filed Feb. 7, 1963
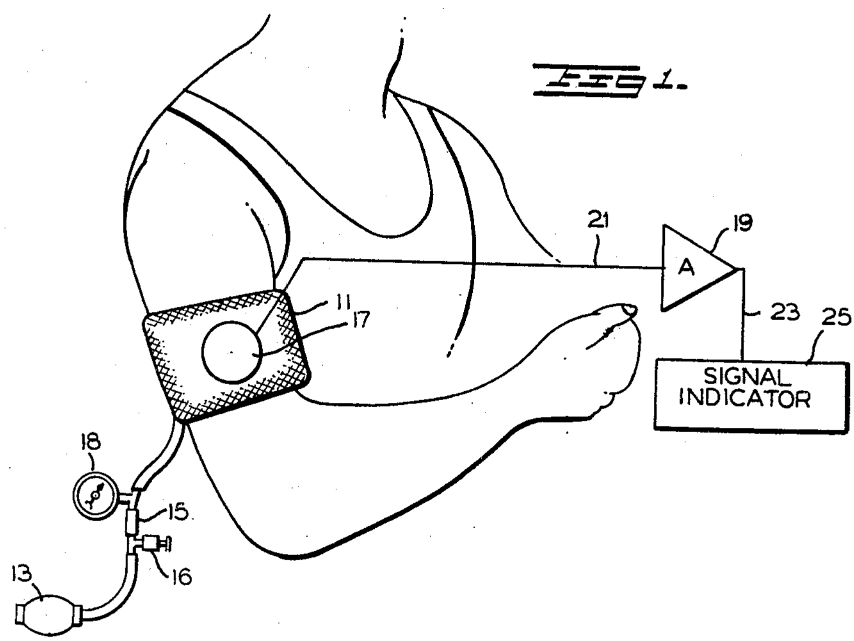
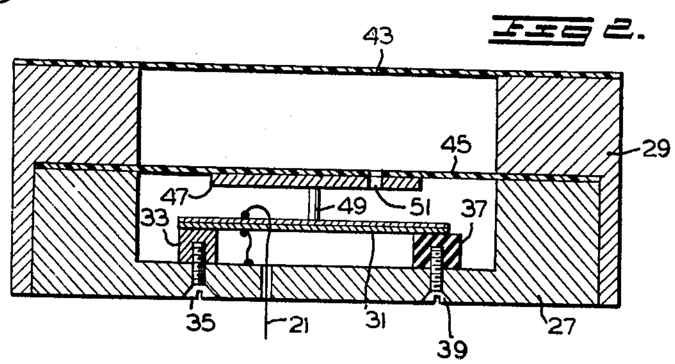
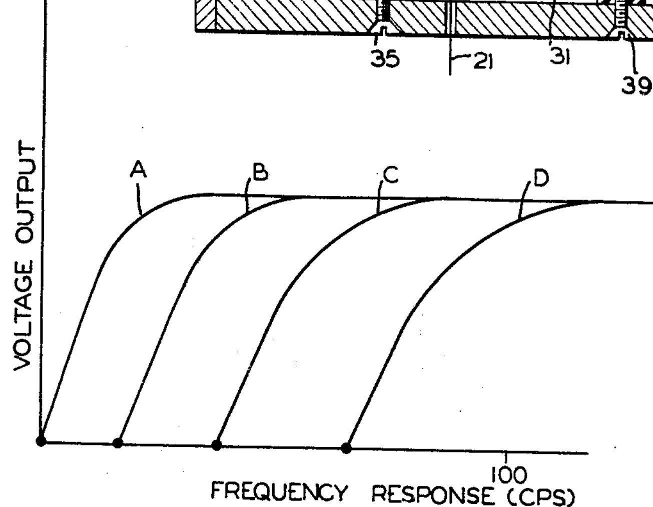
INVENTOR.
PETER SMITH United States Patent Office 3,148,677

Patented Sept. 15, 1964

3,148,677
BRACHIAL TRANSDUCER

Peter Smith, Glendola, N.J., assignor to Dynamics Corporation of America, New York, N.Y., a corporation of New York Filed Feb. 7, 1963, Ser. No. 256,965
7 Claims. (Cl. 128—2.05)

This invention relates generally to acoustical transducers and more specifically to a brachial transducer designed to detect Korotkow sound in a brachial artery of a human being.

Brachial blood pressure transducers for determining systolic and diastolic blood pressures are well known in the art and have been used by physicians for years. More recently, acoustical transducers using electromechanical devices, such as piezoelectric crystals, have also been used to produce an electrical signal output representative of the Korotkow sounds developed in the brachial artery.

One of the problems encountered in using these electromechanical transducers has been that the microphone, being in contact with the arm, has tended to pick up the thermal noises generated by the patient transferring them into the microphone. These thermal noises interfere with the true output of the piezoelectric device and present a signal which is difficult to read and sometimes inaccurate due to the addition of the electrical signals generated above and beyond that produced by the Korotkow sounds.

A further problem which has been encountered in the use of this type of device has been the pressure effect caused by the slightly varying pressure in the cuff depressing the diaphragm within the transducer against the arm in a slowly undulating manner. This action further affects the piezoelectric device, causing an undulating signal output.

Accordingly, it is an object of this invention to provide a transducer for detecting Korotkow sounds for determining diastolic and systolic blood pressures.

Another object of this invention is to provide a Korotkow sound transducer which substantially eliminates thermal noise responses in the transducer.

Yet another object of this invention is to provide a Korotkow sound transducer which substantially eliminates extraneous low frequency pressure variations.

Other objects will become evident from the following description when taken in conjunction with the drawings wherein:

FIG. 1 is an illustration of the use of the transducer of the present invention on the arm of a patient together with the associated equipment for providing a signal indication;

FIG. 2 is a cross section taken through the center of the transducer of the present invention; and FIG. 3 is a graphical representation of the varying frequency response effects which may be obtained through the use of the present invention.

Turning now more specifically to the drawings, FIG. 1 shows the transducer housing 17 applied to the arm in the well-known fashion by means of an inflatable cuff 11 surrounding the housing. The inflatable cuff is connected to a pneumatic pressure means such as bulb 13 for attaining a pressure within the cuff well above the systolic pressure.

After cuff 11 has been inflated to a sufficient pressure, the valve 16 slowly allows the cuff to deflate, and when the systolic pressure is reached, Korotkow sounds are detected by the transducer and supplied to the amplifier 19 by means of lead 21. The amplifier is connected to a signal indicator, such as a light or recording means 25, by means of lead 23 and the indicated signals are noted by the operator. The pressure gauge 18 is read at the time the signals begin to ascertain systolic pressure and at the time the signals end to ascertain the diastolic pressure.

FIG. 2 shows one form of the transducer of the present invention as a housing comprising a base 27 and a sleeve member 29 which is pressure fit onto the base 27. The base 27 and sleeve 29 may be of any durable material such as brass or the like.

Within the base 27 of the housing, a piezoelectric element 31 is mounted at one end thereof to a support member 33 of dielectric material. The piezoelectric element may be secured to the support member by means of adhesive such as epoxy resin or the like. The support member 33 is shown secured to the base 27 by means of a screw 35 extending through the base.

The outer free end of the piezoelectric element is supported by a bumper 37 which may be made of any resilient dielectric material such as soft rubber, and which may also be secured to base 27 by means such as screw 39. Bumper 37 provides the support for the piezoelectric device and yet allows it to be distorted mechanically to provide an output signal to lead 21 which is insulated from the base 27.

A flexible diaphragm 43, which may be made of any of the well-known plastic materials, is secured to the top of the sleeve 29, completely enclosing the open face of the cup-like housing and thus providing a diaphragm which is placed in contact with the skin of the arm of the patient. A second diaphragm 45 of like material is secured within the housing and held in place between the sleeve 29 and the base 27. Therefore, this second diaphragm divides the inner space of the housing into upper and lower compartments.

Secured to the underside of the flexible diaphragm 45 is a rigid plate 47 of a material such as metal. This plate provides the necessary physical rigidity for transferring the acoustical pressures to the piezoelectric element. A rigid member such as rod 49 is mounted between plate 47 and piezoelectric element 31 so that any pressure on the diaphragm 45 moves the plate 47 downwards and the rod member 49 deforms the piezoelectric device 31.

This dual compartment arrangement is provided in order to substantially eliminate the thermal noises discussed above. The diaphragm 43 in contact with the skin absorbs the thermal activity of the skin and the upper compartment insulates the lower diaphragm from this thermal activity. Therefore, when the Korotkow sounds appear in the artery, the upper diaphragm is deformed and the lower diaphragm 45 receives only the shock excitation signals resulting from the Korotkow sounds and actuates the piezoelectric element 31 through the plate 47 and rod 49.

It has been found through the use of the device as discussed above that slowly undulating signals, much in the form of a sine wave of very low frequency, appear during the output of the piezoelectric element even before the Korotkow sounds appear. Additionally, this undulating sine wave continues during the period of the Korotkow sounds and these sounds are impressed upon the sine wave as an output from the piezoelectric element. It is believed that this undulating wave is due to the continued pumping of the heart causing a pressure in the artery at the upper portion of cuff 11. As this pressure is distributed throughout the cuff, the intensity of the signal is reduced and it appears as a low frequency pressure wave causing a slight deformation of the piezoelectric element 31 and the resultant signal discussed above.

The method of substantially eliminating this undulating signal is illustrated in FIG. 3 wherein the various curves are directly related to the number or the size of the orifice 51, FIG. 2, through the diaphragm 45 and the plate 47.

Basically, the orifice 51 provides a means for equalizing the pressure in the upper and lower chambers resulting from slow moving pressure changes affecting diaphragm 43. In effect, this orifice acts as an acoustical filter. FIG. 3 is illustrative of experimental results using a plurality of orifices and/or increasing the diameter of the orifice. In FIG. 3, curve A represents the operation of the device with no orifice through the diaphragm and plate. Curves B, C and D represent frequency response resulting from increasing the size of the orifice. Although the amplitude of the final voltage output is not affected, it can be seen that with the increasing size of the orifice, the piezoelectric device is only responsive to pressure signals above the frequency as indicated on the graph.

Therefore, with the size and/or number of orifices equatable to the frequency response, the total orifice area may be made of a sufficient size to substantially eliminate the slowly undulating elongated sine wave signal discussed above, thus providing a clear and distinct signal response to the Korotkow sounds emanating from the artery.

The above description and drawings are illustrative of the present invention and are not intended to be limitative in any sense. Variation of the shape and dimension of the various parts could be practiced within the scope of the invention.

I claim:

1. A transducer for detecting Korotkow sounds in the brachial artery comprising a base, a piezoelectric device mounted on said base, a sleeve member open at the upper end thereof mounted on said base, a first flexible diaphragm mounted between said base and said sleeve member, a rigid plate secured to said first diaphragm, at least one orifice through said diaphragm and said plate, a second flexible diaphragm over the open end of said sleeve member, and coupling means extending between said rigid plate and said piezoelectric device for flexing said device in response to said Korotkow sounds.

2. A transducer for detecting Korotkow sounds in the brachial artery comprising a cup-shaped housing, a piezoelectric device mounted at one end thereof to the base of said cup-shaped housing, a first flexible diaphragm covering the open end of said cup-shaped housing, a second flexible diaphragm mounted within said housing between said first diaphragm and said piezoelectric device substantially parallel to said first diaphragm, a rigid plate mounted centrally on and supported by said second flexible diaphragm, and rigid means coupled between said rigid plate and said piezoelectric device for flexing said device in response to said Korotkow sounds.

3. The apparatus of claim 2 further comprising at least one orifice through said second diaphragm and said rigid plate.

4. A brachial transducer comprising a cup-shaped housing, a piezoelectric device mounted at one end thereof within said housing, said piezoelectric device extending substantially parallel to the base of said housing, a first flexible diaphragm covering the mouth of said cup-shaped member, a second flexible diaphragm mounted within said housing between said piezoelectric device and said first diaphragm, said second diaphragm being substantially parallel to said first diaphragm, a rigid plate secured to and supported by said second diaphragm, and means coupled between said plate and said piezoelectric device for flexing said device in response to pressures exerted against said first diaphragm.

5. The apparatus of claim 4 wherein there is at least one orifice through said second diaphragm and said plate.

6. A transducer for detecting Korotkow sounds in a brachial artery comprising a cup-shaped housing, a piezoelectric device mounted at one end thereof within said housing, a first flexible diaphragm covering the mouth of said housing, a second flexible diaphragm mounted within the housing between said piezoelectric device and said first diaphragm for dividing said housing into two compartments said second diaphragm being substantially parallel to said first diaphragm, a plate mounted on and supported by said second diaphragm, and rigid means coupled between said plate and said piezoelectric device.

7. The apparatus of claim 6 further comprising at least one orifice through said second diaphragm for equalizing gradual air pressure variations in said two compartments.

References Cited in the file of this patent

UNITED STATES PATENTS

| | | |
|---|---|---|
| 2,658,505 | Sheer | Nov. 10, 1953 |
| 2,959,056 | Traite | Nov. 8, 1960 |
| 3,056,401 | Greenspan | Oct. 2, 1962 |